United States Patent [19]

Nagra et al.

[11] Patent Number: 4,648,453

[45] Date of Patent: Mar. 10, 1987

[54] PROCESS FOR REMEDIAL CEMENTING

[75] Inventors: Surjit S. Nagra; Andrew R. Strilchuk, both of Calgary, Canada

[73] Assignee: Exxon Production Research Co., Houston, Tex.

[21] Appl. No.: 799,072

[22] Filed: Nov. 18, 1985

[51] Int. Cl.⁴ ............................................ E21B 33/138
[52] U.S. Cl. .................... 166/281; 166/284; 166/285; 166/304
[58] Field of Search ............... 166/281, 284, 285, 304, 166/312

[56] References Cited

U.S. PATENT DOCUMENTS

| | | |
|---|---|---|
| 1,410,827 | 3/1922 | Muehl . |
| 2,163,449 | 6/1939 | Owsley et al. .................... 166/281 |
| 2,308,425 | 1/1943 | Prince . |
| 2,813,584 | 11/1957 | Teplitz ........................ 166/281 X |
| 2,842,205 | 7/1958 | Allen et al. ...................... 166/285 |
| 2,933,136 | 4/1960 | Ayers et al. ...................... 166/284 |
| 3,010,514 | 11/1961 | Fox ................................ 166/284 |
| 3,052,298 | 9/1962 | Malott . |
| 3,348,612 | 10/1967 | Messenger ................. 166/312 X |
| 3,402,770 | 9/1968 | Messenger . |
| 3,530,939 | 9/1970 | Turner et al. .................... 166/303 |
| 3,532,168 | 10/1970 | Webb .............................. 166/292 |
| 3,547,197 | 12/1970 | Chevalier et al. ............... 166/284 |
| 3,688,845 | 9/1972 | Messenger ...................... 166/291 |
| 3,743,020 | 7/1973 | Suman, Jr. et al. .......... 166/281 X |
| 3,970,148 | 7/1976 | Jones et al. ................. 166/304 X |
| 4,127,174 | 11/1978 | Sharpe et al. .................... 166/291 |
| 4,139,060 | 2/1979 | Muecke et al. .................. 166/281 |
| 4,207,193 | 6/1980 | Ford et al. ................... 252/8.55 B |
| 4,244,425 | 1/1981 | Erbstoesser ...................... 166/284 |
| 4,287,952 | 9/1981 | Erbstoesser ...................... 166/284 |
| 4,301,868 | 11/1981 | Scherubel et al. ................ 166/308 |
| 4,531,583 | 7/1985 | Revett ........................ 166/297 X |

*Primary Examiner*—George A. Suchfield
*Attorney, Agent, or Firm*—David H. Vickrey; Richard F. Phillips

[57] ABSTRACT

An improved method is disclosed for remedial cementing operations. Prior to conducting the remedial cementing operation, the zone to be cemented is pretreated with a hydrocarbon solvent capable of dissolving hydrocarbons, such as oils and asphaltenes. Following solvent treatment, the zone may be treated with an acid solution capable of dissolving mineral constituents.

25 Claims, No Drawings

PROCESS FOR REMEDIAL CEMENTING

FIELD OF THE INVENTION

This invention pertains to remedial cementing of a well casing. More specifically, the method is directed to a process for treating a wellbore prior to conducting the remedial cementing operation.

BACKGROUND OF THE INVENTION

In completing oil and gas wells, it is common practice to set a string of pipe, known as casing, in the well and place cement around the outside of the casing to isolate the various hydrocarbon bearing formations penetrated by the well. To establish communication between the hydrocarbon bearing formations and the interior of the casing, the casing and its cement sheath are perforated. After the well is completed, hydrocarbons are produced from the subterranean formations.

During the course of hydrocarbon production from the subterranean formation, the rate of production may decline or be substantially reduced for a variety of reasons. For example, most recoverable hydrocarbons may have been produced from a particular zone in the formation or the reservoir pressure may have become so low that the hydrocarbons no longer flow at a sufficient rate. In other cases, like miscible floods with a gas, an early breakthrough of the gas may occur resulting in no hydrocarbon production. In such instances of reduced production, it may be desirable to shut off the perforations with cement and to reperforate lower or higher in the formation to produce the hydrocarbons. The present invention is particularly related to and useful in remedial cementing to shut off perforations. It is also useful to plug off channels behind the casings. If these channels are not plugged, injected fluids may migrate to unintended zones. In production wells, unplugged channels behind the casing may cause the production of undesired fluids from unintended zones.

Typically, when perforations are to be sealed, a remedial cementing operation is performed in which cement is simply pumped into the well casing and squeezed through the perforations until it contacts the surrounding formation. When channels are to be plugged, the cement squeeze operations are continued until a plug is formed in the channel. However, it is quite common that such cement squeeze operations to seal perforations and/or plug channels have to be repeated several times before a satisfactory seal or plug is obtained. As is readily apparent, the costs associated with well workover and lost production time increase each time a cement squeeze operation has to be repeated. Therefore, there exists in the industry a need to efficiently and effectively seal wellbore perforations and plug channels behind casings.

SUMMARY OF THE INVENTION

The present invention provides an improved method for a remedial cementing operation. The invention comprises pretreating the remedial cementing zone with a hydrocarbon solvent capable of dissolving oils, asphaltenes or other hydrocarbons. After solvent treatment, the zone may also be treated with an acid solution capable of dissolving the mineral constituents of the inorganic fines. These treating materials are displaced into the formation before cement is squeezed into the wellbore perforations.

DETAILED DESCRIPTION OF THE INVENTION

The present invention is applicable in wellbores having a casing arranged therein which penetrates a subterranean formation. The wellbore is in communication with the hydrocarbon producing intervals of the formation by means of perforations which extend through the casing and surrounding cement sheath. In order to seal off these perforations, it is necessary to perform a remedial cementing operation whereby cement is squeezed into the perforations.

It has been discovered that one reason for remedial cementing failures is the presence of hydrocarbons (such as oils and asphaltenes) and inorganic fines in and around the perforations. Such materials prevent the injected cement from adequately contacting and adhering to the surfaces around the perforations. Therefore, in practicing this invention, it is necessary to pretreat the remedial cementing zone with a hydrocarbon solvent capable of dissolving such hydrocarbons. Suitable hydrocarbon solvents include xylene, toluene, benzene, kerosene, diesel oil, carbon disulfide and some refinery distillation cuts containing single aromatic ring hydrocarbons (such as "Reformate", available from Esso Chemical Canada, a division of Imperial Oil Canada Ltd.). The preferred solvent is xylene, primarily because it is relatively safe to handle and asphaltenes are highly soluble in it. Of course, any material which adequately dissolves hydrocarbons present in and around the wellbore may be used. The soak period will vary depending on the solvent used and the severity of the problem. However, the soak period may be as long as necessary to adequately dissolve the deposited hydrocarbons. Typically, the soak period will range from 0 to 72 hours. If xylene is used, a soak period of 24 hours or less is usually sufficient. The hydrocarbon solvent may also contain compatible additives, such as surfactants and cosolvents.

The amount of solvent needed to perform this treatment varies with the material used, and may range from 0.3 $m^3$ to 1.5 $m^3$ per meter of perforated casing. If xylene is used, the preferred amount is about 3 $m^3$ of xylene for each 10 meters of perforated casing.

The solvent is injected as a slug or staged into the wellbore and displaced to the perforated zone by a suitable displacement fluid, i.e., water. A spacer may be used to separate the solvent from the displacement fluid, and a packer above and below the perforated zone will help isolate the area to be treated. The solvent is squeezed through the perforations into the surrounding formation with some solvent retained within the wellbore across the perforations. The solvent is then allowed to soak. Diverting agents may be added to the hydrocarbon solvents to temporarily seal some open perforations in order to direct the solvent into perforations which need to be treated. Use of diverting agents known as "ball sealers" as described in U.S. Pat. No. 4,244,425 to Erbstoesser is preferred.

Following the soak period, the hydrocarbon solvent is flushed into the formation with a suitable material, such as water. The hydrocarbon solvent which is forced into the formation carries with it the dissolved hydrocarbons. In an alternative procedure, the solvent is produced with the dissolved hydrocarbons in a flowback operation. Thereafter, cement is injected into the wellbore for the remedial cementing operation. The various methods of remedial cementing are old and known by those skilled in the art. However, an unexpected advantage is obtained by pretreating the remedial zone with a hydrocarbon solvent.

As mentioned earlier, other materials in the wellbore may adversely affect the cement bond. Such materials include inorganic fines that migrate to the perforations during production. As an optional step, an acid solution may be used to pretreat the remedial zone prior to injecting the cement. In this acidizing step, an acid capable of dissolving the mineral constituents of the inorganic fines is injected into the formation. After a suitable period of time, usually ranging from 0 to 24 hours, the spent acid is flushed into the formation by a suitable material, such as water. In an alternative procedure, the spent acid is produced. Thereafter, cement is injected as previously described. Suitable acids include hydrochloric, acetic, sulfamic, formic, citric, EDTA, hydrofluoric, nitric, sulfuric and various mixtures thereof. The preferred acid is hydrochloric or a mixture of hydrochloric and hydrofluoric, known as mud acid, but one skilled in the art can readily determine the appropriate acid.

The effective amount of acid solution may range from $0.1$ m$^3$ to $0.5$ m$^3$ per meter of perforated casing, depending on the type and strength of acid used. For 15% hydrochloric acid, a preferred amount is $1.5$ m$^3$ per 10 meters of perforation.

The acidizing step is described as optional because tests have shown that the majority of the undesirable material in and around the wellbore consists of asphaltenes and other heavy end hydrocarbons. It may not be necessary to dissolve the inorganic fines, but it is believed that performing the acidizing pretreatment will improve the bond between the cement and the perforations. If the acidizing step is performed, it is preferred that the hydrocarbon solvent be injected prior to the acid solution. Otherwise, the asphaltenes may prevent the acid solution from acting upon the mineral constituents of the inorganic fines.

COMPARATIVE EXAMPLE

In an effort to plug two sets of perforations in a producing well, a standard remedial cementing operation was performed. The perforations were at 10 meter intervals. In order to satisfactorily shut off both sets of perforations by standard methods, eight cement squeeze operations had to be performed.

EXAMPLE USING THE PROCESS OF THE CURRENT INVENTION

In a similar well having two sets of perforations, a three cubic meter slug of hydrocarbon solvent was injected into each 10 meter interval of perforated casing. The solvent contained 88 wt. % xylene, 10 wt. % Corexit 7610 (available from Esso Chemical Canada, a division of Imperial Oil Canada, Ltd.) as a cosolvent and 2 wt. % Corexit 7836 (available from Esso Chemical Canada, a division of Imperial Oil Canada, Ltd.) as a surfactant. After soaking for 24 hours in the vicinity of the perforations and surrounding formation, the hydrocarbon solvent was flushed into the formation with water. Next, one and a half cubic meters of 15% HCl containing high temperature corrosion inhibitor was squeezed into the perforations and allowed to soak for 4 hours. This acid solution was also flushed into the formation with water. Following the second water flush, an ordinary cement squeeze operation was performed. Both sets of perforations were successfully sealed after only one cement squeeze operation.

It can be seen that the present invention possesses a definite and unexpected advantage over traditional remedial cementing operations. This advantage will result in reduced workover costs and reduced loss of production time.

The principle of this invention and the best mode in which it is contemplated to apply that principle have been described. It is to be understood that the foregoing is illustrative only and that other means and techniques can be employed without departing from the true spirit of this invention defined in the claims.

We claim:

1. A process for remedial cementing of perforations in a well casing penetrating a subterranean formation comprising:
    (a) pretreating the zone wherein said remedial cementing is to be performed by injecting into said zone a hydrocarbon solvent capable of dissolving hydrocarbons;
    (b) permitting said hydrocarbon solvent to remain in said zone for a period of time sufficient to dissolve said hydrocarbons;
    (c) pumping cement to said zone wherein said remedial cementing is to be performed; and
    (d) squeezing said cement into said perforations in said casing.

2. The process of claim 1 wherein said hyrocarbon solvent is selected from the group consisting of xylene, toluene, benzene, kerosene, diesel oil, carbon disulfide, refinery distillation cuts containing single aromatic ring hydrocarbons and mixtures thereof.

3. The process of claim 1 wherein said hydrocarbon solvent contains diverting agents.

4. The process of claim 3 wherein said diverting agents are ball sealers.

5. The process of claim 1 further comprising displacing said hydrocarbon solvent into said formation after dissolution of said hydrocarbons.

6. The process of claim 1 further comprising flowing back said hydrocarbon solvent after dissolution of said hydrocarbons.

7. The process of claim 1 further comprising treating said zone, prior to step (c), with an acid solution capable of dissolving mineral constituents of inorganic fines.

8. The process of claim 7 wherein said acid is selected from the group consisting of hydrochloric, acetic, citric, sulfonic, formic, EDTA, hydrofluoric, sulfuric, nitric and mixtures thereof.

9. The process of claim 7 wherein said acid contains diverting agents.

10. The process of claim 9 wherein said diverting agents are ball sealers.

11. The process of claim 7 further comprising displacing said acid solution into said formation after dissolution of said mineral constituents and prior to step (c).

12. The process of claim 7 further comprising flowing back said acid solution after dissolution of said mineral constituents and prior to step (c).

13. A process for remedial cementing of channels behind a well casing penetrating a subterranean formation comprising:
    (a) pretreating the zone wherein said remedial cementing is to be performed by injecting into said zone a hydrocarbon solvent capable of dissolving hydrocarbons;

(b) permitting said hydrocarbon solvent to remain in said zone for a period of time sufficient to dissolve said hydrocarbons;

(c) pumping cement to said zone wherein said remedial cementing is to be performed; and (d) squeezing said cement through perforations in said casing and into said channels behind said casing.

14. The process of claim 13 wherein said hyrocarbon solvent is selected from the group consisting of xylene, toluene, benzene, kerosene, diesel oil, carbon disulfide, refinery distillation cuts containing single aromatic ring hydrocarbons and mixtures thereof.

15. The process of claim 13 wherein said hydrocarbon solvent contains diverting agents.

16. The process of claim 15 wherein said diverting agents are ball sealers.

17. The process of claim 13 further comprising displacing said hydrocarbon solvent into said formation after dissolution of said hydrocarbons.

18. The process of claim 13 further comprising flowing back said hydrocarbon solvent after dissolution of said hydrocarbons.

19. The process of claim 13 further comprising treating said zone, prior to step (c), with an acid solution capable of dissolving mineral constituents of inorganic fines.

20. The process of claim 19 wherein said acid is selected from the group consisting of hydrochloric, acetic, citric, sulfonic, formic, EDTA, hydrofluoric, sulfuric, nitric and mixtures thereof.

21. The process of claim 19 wherein said acid contains diverting agents.

22. The process of claim 21 wherein said diverting agents are ball sealers.

23. The process of claim 19 further comprising displacing said acid solution into said formation after dissolution of said mineral constituents and prior to step (c).

24. The process of claim 19 further comprising flowing back said acid solution after dissolution of said mineral constituents and prior to step (c).

25. A method for plugging a zone of perforations in a cemented well casing penetrating a subterranean formation, said method comprising the steps of:

(a) injecting into said zone of perforations a hydrocarbon solvent to dissolve any asphaltenes and other accumulated hydrocarbons in said zone of perforations:

(b) injecting into said zone of perforations an acid solution adapted to dissolve mineral constituents of accumulated rock particles within and immediately surrounding said perforations;

(c) pumping cement to said zone of perforations; and (d) forcing said cement through the perforations in said zone.

* * * * *